(12) United States Patent
Bryne (10) Patent No.: US 7,472,498 B2
(45) Date of Patent: Jan. 6, 2009

(54) CLEAT ASSEMBLY FOR CLIPLESS PEDAL

(75) Inventor: Richard M. Bryne, San Diego, CA (US)

(73) Assignee: Speedplay, Inc., San Diego, CA (US)

( * ) Notice: Subject to any disclaimer, the term of this patent is extended or adjusted under 35 U.S.C. 154(b) by 416 days.

(21) Appl. No.: 11/250,911

(22) Filed: Oct. 13, 2005

(65) Prior Publication Data

US 2007/0084086 A1 Apr. 19, 2007

(51) Int. Cl.
*A43B 5/14* (2006.01)
*G05G 1/14* (2006.01)

(52) U.S. Cl. ........................ 36/131; 74/594.4
(58) Field of Classification Search ................ 36/131; 74/594.6, 594.4
See application file for complete search history.

(56) References Cited

U.S. PATENT DOCUMENTS

| | | | | |
|---|---|---|---|---|
| 4,827,797 A * | 5/1989 | Le Faou et al. | ............ | 74/594.6 |
| 4,942,778 A | 7/1990 | Bryne | | |
| 5,213,009 A | 5/1993 | Bryne | | |
| 5,606,894 A | 3/1997 | Bryne | | |
| 5,657,558 A | 8/1997 | Pohu | | |
| 5,687,619 A | 11/1997 | Bryne | | |
| 5,862,716 A | 1/1999 | Bryne | | |
| 6,244,136 B1 | 6/2001 | Chen | | |
| 6,494,117 B1 * | 12/2002 | Bryne | ........................ | 74/594.6 |

2004/0187635 A1 9/2004 Bryne

FOREIGN PATENT DOCUMENTS

| | | |
|---|---|---|
| EP | 0 153 210 | 8/1985 |
| EP | 0 293 340 | 11/1988 |
| FR | 2 775 424 | 9/1999 |
| JP | 05111402 | 5/1993 |

* cited by examiner

*Primary Examiner*—Ted Kavanaugh
(74) *Attorney, Agent, or Firm*—Sheppard Mullin Richter & Hampton LLP (57) ABSTRACT

An improved cleat assembly is disclosed, the assembly containing one or more spring clips configured for releasably securing the assembly to a bicycle pedal or the like. Specifically, the cleat assembly is configured such that an improper over-tightening of the cleat onto the sole of a user's shoe has substantially no effect on the free flexing of the spring clip while it is engaging or disengaging to/from the pedal. In addition, the cleat assembly incorporates a pair of soft plastic caps that frictionally engage the ground when the user walks about, to provide improved traction and to eliminate undesired wear of critical assembly components. Further, for embodiments of cleat assemblies of the kind incorporating one or more adjustable set screws for adjusting the assemblies' float angles, threaded apertures for the set screws are formed by the confronting surfaces of a plastic upper plate and a metallic bottom plate, wherein the threads are formed only in the plastic upper plate. This allows the upper plate to be conveniently formed of an injection-molded plastic material and the bottom plate to be conveniently stamped from a piece of sheet metal.

20 Claims, 8 Drawing Sheets

CLEAT ASSEMBLY FOR CLIPLESS PEDAL

BACKGROUND OF THE INVENTION

This invention relates generally to cleat assemblies configured for releasable securement to pedals for bicycles and the like, and, more particularly, to cleat assemblies incorporating flexible spring clips for releasable engagement with the pedals.

Cleat assemblies of this particular kind typically include a spring housing and an overlaying bottom plate configured to be attached to the sole of a user's shoe. The spring housing and bottom plate, together, define a central opening sized and configured to conformably receive a pedal. The spring housing supports one or more spring clips adjacent to the central opening, for engaging and releasably retaining the pedal.

When the cleat assembly is disengaged from a pedal and the user is walking about on the ground, the cleat assembly's bottom plate is in direct engagement with the ground. The bottom plate typically is formed of a metallic material, so this direct engagement has required the user to use special care when walking about. This direct engagement also has led to undesired wear of the bottom plate.

In the past, tightening of the bottom plate over the spring housing has sometimes unduly restricted free flexing movement of the spring clip, thus sometimes making it more difficult to engage/disengage the spring clip to/from the pedal. Users have overcome this drawback in the past only by exercising proper care when tightening the bottom plate.

Some cleat assemblies of this particular kind have been configured to provide an adjustable float angle, typically being provided by one or more set screws. In the past, the set screws have been supported in threaded apertures, which typically have been formed by a manual tapping procedure. This has been found to be unduly labor-intensive and expensive.

It should be appreciated from the foregoing description that there is a need for an improved cleat assembly that overcomes the drawbacks discussed above. Specifically, there is a need for a cleat assembly configured to allow for a range of tightening of its components' without substantially affecting the free flexing of the assembly's one or more spring clips. Further, there is a need for a cleat assembly configured to eliminate direct engagement between metallic components and the ground when assembly is disengaged from a pedal and the user is walking about. Further, there is a need for an improved cleat assembly of a kind incorporating one or more set screws for adjusting the assembly's float angle, which eliminates the need to manually tap a threaded aperture for supporting each set screw. The present invention satisfies these needs and provides further related advantages.

SUMMARY OF THE INVENTION

The present invention is embodied in a cleat assembly incorporating one or more spring clips for releasably securing the assembly to a clipless pedal, while allowing for a range of tightening of its components without substantially affecting the free flexing of the one or more spring clips. More particularly, the cleat assembly includes a first plate disposed adjacent to the underside of a user's shoe, and a second plate disposed over the first plate, wherein the second plate includes a forward flange projecting forward of a forward end of the first plate and a rearward flange projecting rearward of a rearward end of the first plate. An aperture is defined in the second plate, which is sized and configured to receive the clipless pedal. In addition, a space is defined between the first and second plates, for accommodating the one or more spring clips that can releasably secure the assembly to the clipless pedal. The forward and rearward flanges of the second plate are configured for attachment directly to the underside of the user's shoe, without affecting the size of the space between the first and second plates.

In other, more detailed features of the invention, the cleat assembly further includes a forward cap disposed over the forward flange of the second plate, and a rearward cap disposed over the rearward flange of the second plate. These caps engage the ground when the user walks thereon. Each cap preferably is disposed over substantially the entire surface of its associated flange. In addition, the caps preferably both incorporate a molded elastomeric material, e.g., polyurethane.

In one embodiment of the invention, the cleat assembly is configured to provide an adjustable float angle. In this embodiment, the assembly's spring clip can releasably engage the clipless pedal in a manner that allows limited rotation of the first and second plates relative to the pedal, while the spring clip remains rotationally locked to the pedal. The cleat assembly further includes one or two set screws defining a space for receiving a finger that is part of the spring clip. In operation, the cleat assembly's first and second plates are free to rotate relative to the pedal through a float angle whose limits are reached when a set screw comes into contact with the finger of the spring clip. Rotation beyond that limit causes the spring clip to release its engagement with the pedal.

The size of the float angle can be adjusted by selectively rotating the one or more the set screws, to vary the size of the space that receives the spring clip's finger. Advantageously, each set screw is received within a threaded apertures that is defined by confronting surfaces of the first and second plates. The first plate preferably comprises a molded plastic material, and the second plate preferably comprises a metallic material, preferably steel. In addition, manufacturability is enhanced by configuring only the confronting surface of the first plate to be threaded; the confronting surface of the second plate can remain unthreaded.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

Figure 3:
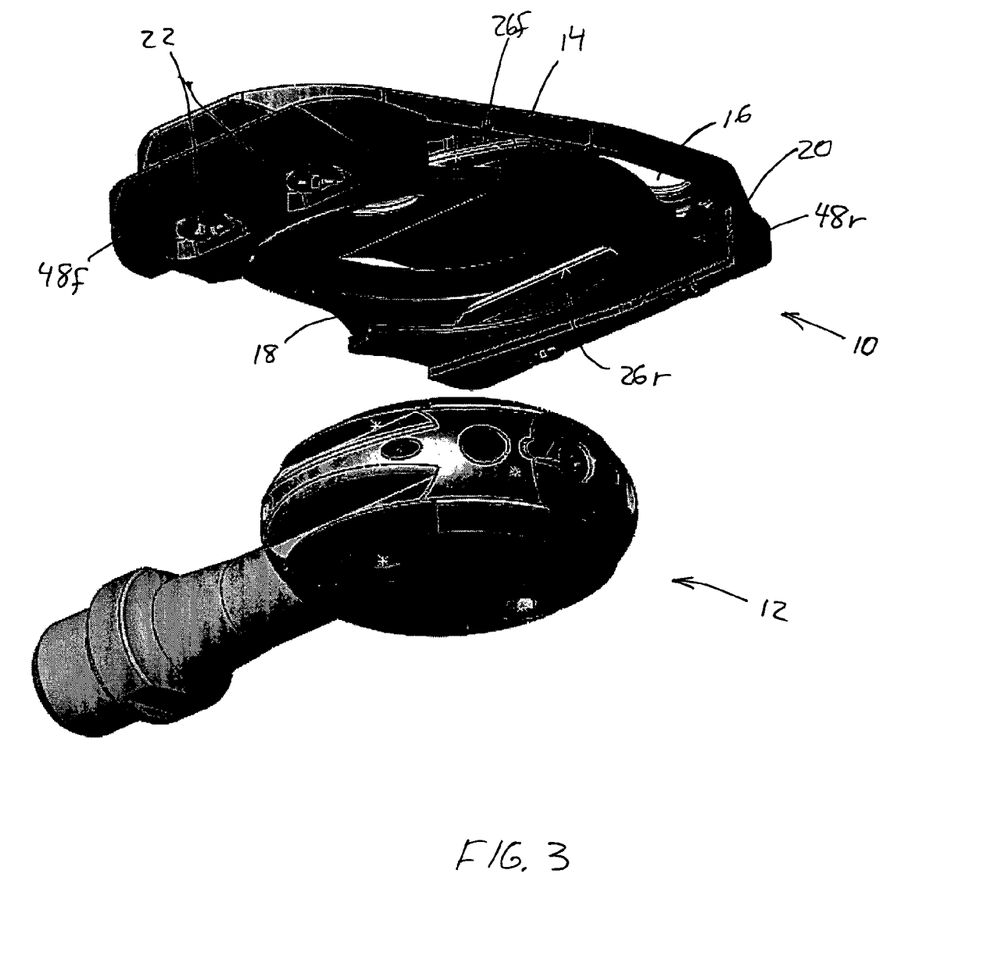
FIG. 3 is a perspective view of the underside of the cleat assembly of FIG. 1, showing the cleat assembly positioned above a pedal.
Figure 4:
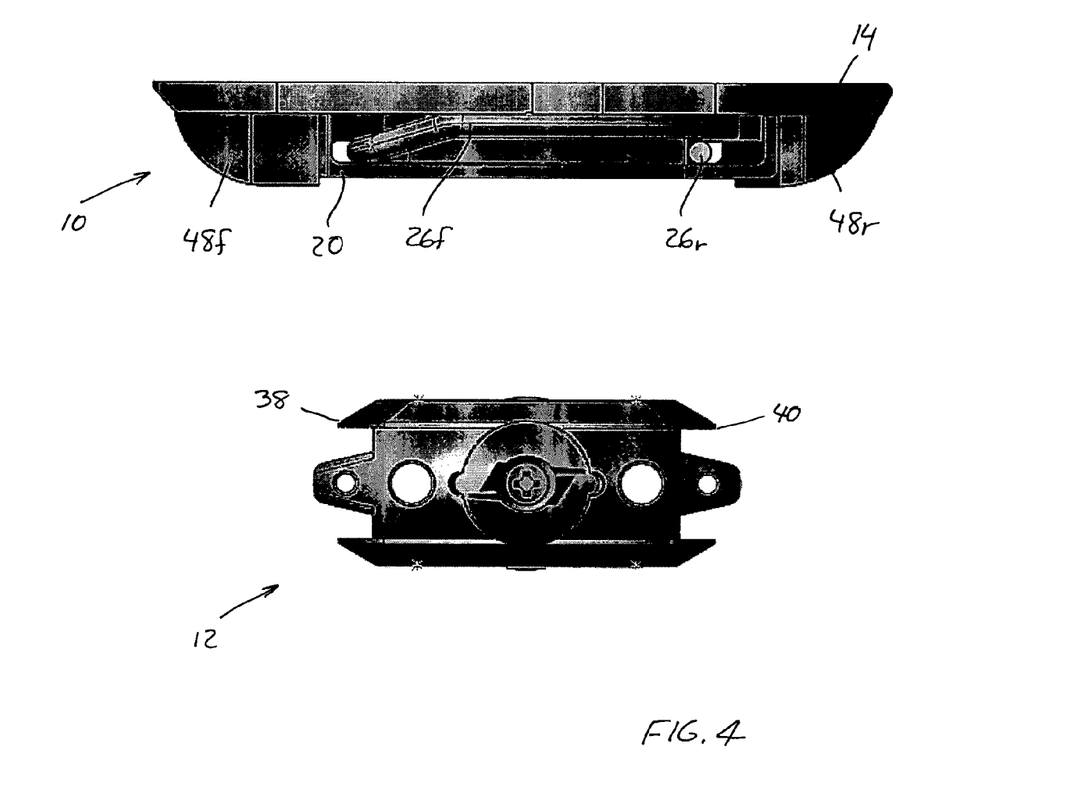
FIG. 4 is an elevational view of the cleat assembly of FIG. 1, showing the cleat assembly positioned immediately above the pedal.
Figure 5:
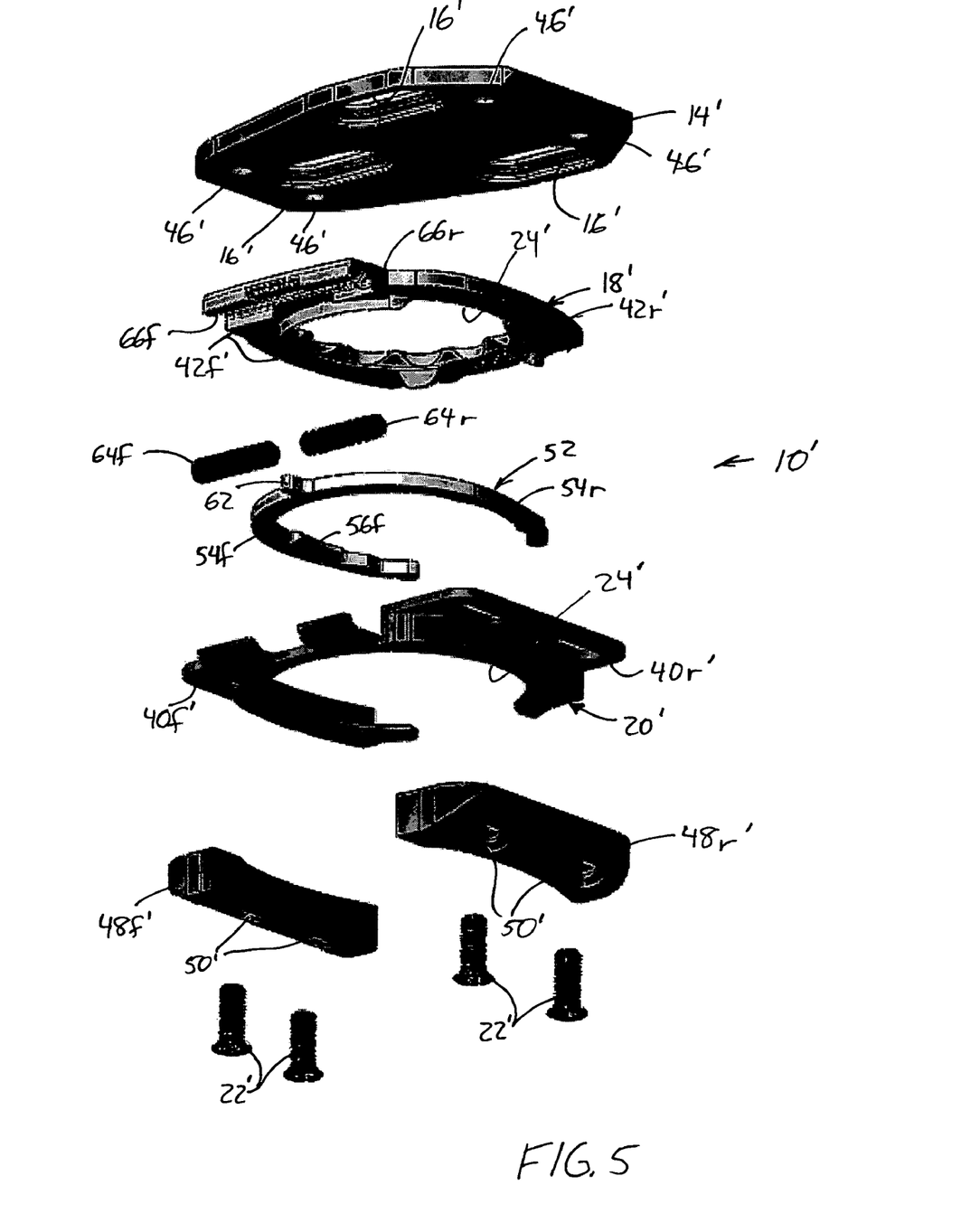
FIG. 5 is an exploded perspective view of the underside of a second embodiment of a cleat assembly in accordance with the invention.
Figure 6:
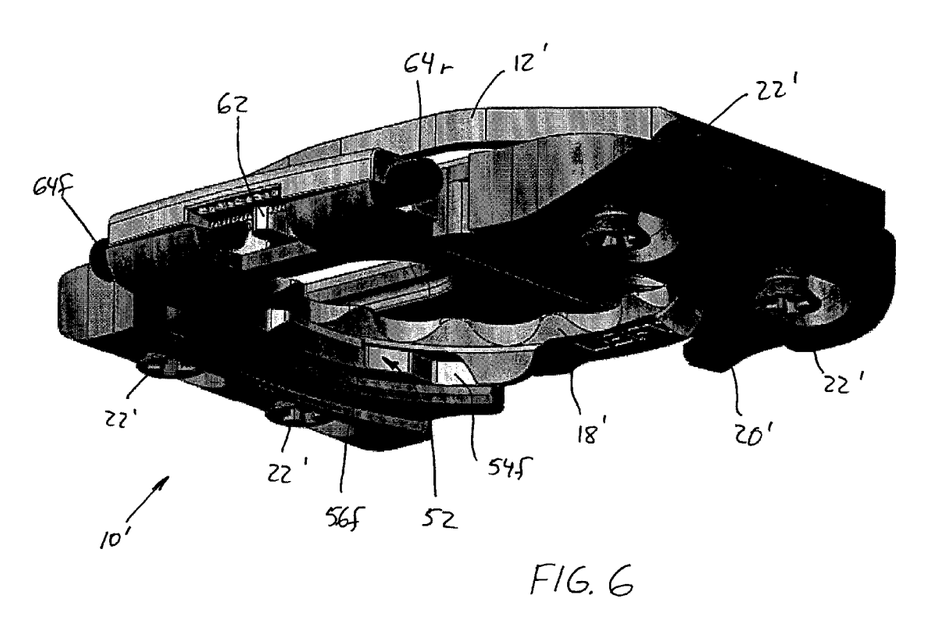
FIG. 6 is a perspective view of the underside of the cleat assembly of FIG. 5, shown in its assembled condition.
Figure 7:
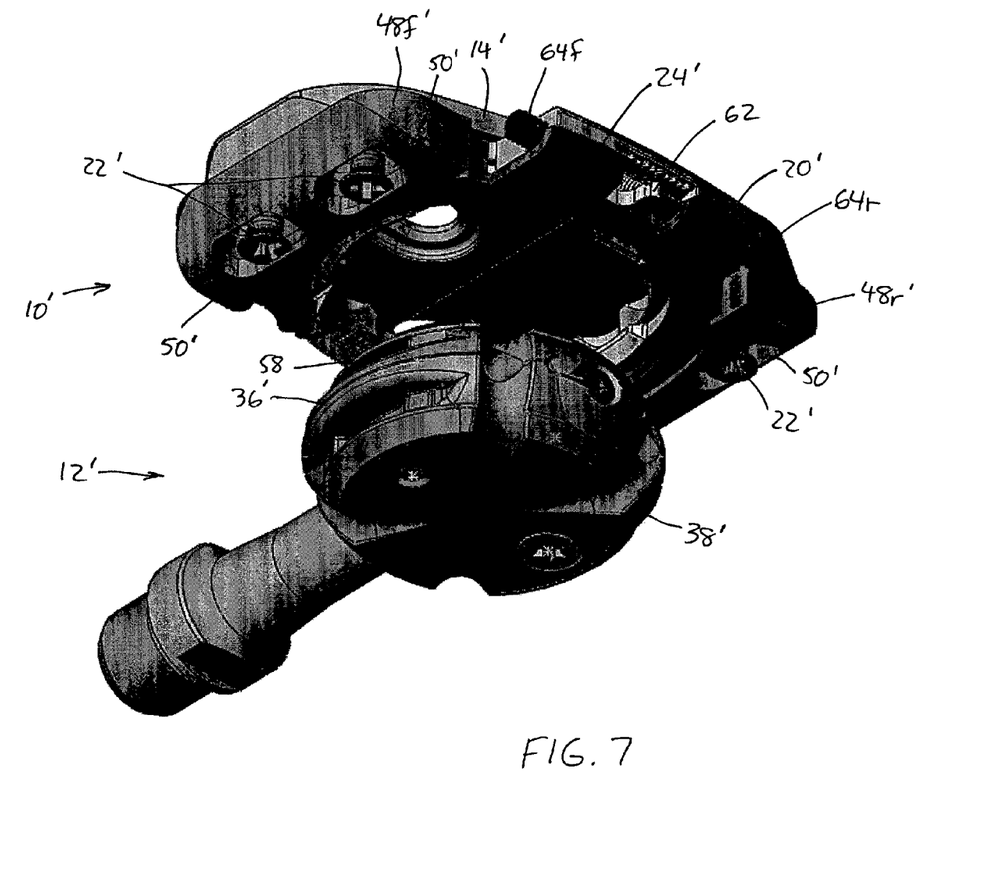
FIG. 7 is a perspective view of the underside of the cleat assembly of FIG. 5, taken from a different viewpoint from that of FIGS. 5 and 6 and showing the cleat assembly positioned adjacent to a pedal.
Figure 8:
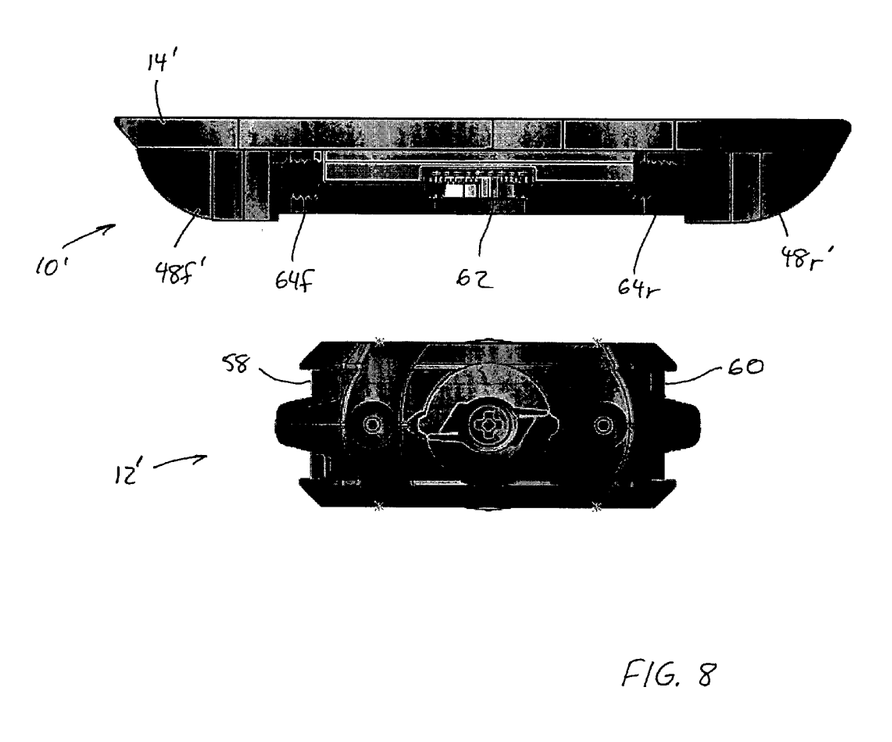
FIG. 8 is an elevational view of the cleat assembly of FIG. 5, showing the cleat assembly positioned immediately above the pedal.

With reference now to the illustrative drawings, and particularly to FIGS. 1-4, there is shown a first embodiment of a cleat assembly 10 in accordance with the invention, configured for attachment to the sole of a user's shoe (not shown) and for releasable securement to a bicycle pedal 12 (FIGS. 3 and 4). The particular cleat assembly depicted is configured for attachment to the user's left shoe, but it will be appreciated that a similar cleat assembly could be oppositely configured for attachment to the user's right shoe. The cleat assembly includes a plastic base plate 14 configured to be secured to the shoe's sole (not shown) by screws,(not shown) extending through three elongated openings 16, and it further includes a plastic spring housing 18 and a steel bottom plate 20 configured to be secured, together, by four screws 22 to the plastic base plate. 14. The spring housing 18 and bottom plate 20, together, define a circular central opening 24 sized and shaped to conformably receive the pedal 12. A forward spring clip 26f and a rearward spring clip 26r are mounted between the spring housing 18 and the bottom plate 20, for releasably engaging the pedal when the cleat assembly is positioned over the pedal.

More particularly, the forward and rearward spring clips 26f, 26r each are formed from a single length of spring steel, which is bent into a special shape that includes a pivot section 28f, 28r; an arcuate mid-section 30f, 30r; and a generally straight engagement section 32f, 32r. The pivot sections 28f, 28r are confined within small recesses 34f, 34r formed in the bottom plate; the arcuate mid-sections 30f, 30r extend around portions of the circular central opening 24; and the straight engagement sections 32f, 32r extend as chords through forward and rearward portions of the central opening.

The straight engagement section 32f of the forward spring clip 26f is positioned to engage and retain a forward edge 36 of the pedal 12 (FIGS. 3 and 4), and the straight engagement section 32r of the rearward spring clip 26r is positioned to engage and retain the pedal's rearward edge 38. Sufficient space is provided forward of the forward engagement section 32f, and rearward of the rearward engagement section 32r, to allow the two engagement sections to flex apart as the cleat assembly 10 is engaged with the pedal. The cleat assembly can be disengaged from the pedal by rotating either clockwise (i.e., heel out, for a left cleat assembly) or counterclockwise (i.e., heel in, for a left pedal), to forcibly retract the forward and rearward spring clips' engagement sections. In this regard, the shape and function of the forward and rearward spring clips 26f, 26r are similar to that of corresponding components incorporated into a cleat assembly disclosed in U.S. Pat. No. 5,213,009, issued in the name of Richard M. Bryne, which is incorporated herein by reference.

In the past, free flexing movement of the forward and rearward spring clips has sometimes been impaired by an improper over-tightening of the cleat assembly's bottom plate relative to its spring housing. The cleat assembly 10 of FIGS. 1-4 overcomes this impairment by ensuring that tightening of the bottom plate 20 over the spring housing 18 has substantially no effect on the size of the space that accommodates the forward and rearward spring clips 26f, 26r. This is accomplished by configuring the bottom plate to include a forward flange 40f projecting forward of the spring housing's forward end 42f and a rearward flange 40r projecting rearward of the spring housing's rearward end 42r. Each flange incorporates two elongated openings 44 that align with threaded apertures 46 formed in the plastic base plate 14. The flanges are tightened against the base plate using the screws 22, which engage the base plate's threaded apertures. The degree of tightening has no substantial effect on the size of the space between the bottom plate 20 and the spring housing 18, whereby flexing of the forward and rearward spring clips 26f, 26r during engagement and disengagement from the pedal is unimpaired.

The cleat assembly 10 further includes forward and rearward caps 48f, 48r that overlay the respective forward and rearward flanges 40f, 40r of the bottom plate 20. Each cap includes a pair of elongated, beveled openings 50 aligned with the openings 44 of the corresponding flange, such that the screws 22 function to secure not only the bottom plate over the spring housing 18, but also the caps over the flanges. The caps are sized to project slightly above the exposed surface of the bottom plate, and the exposed edges of the caps are rounded. The bottom plate thereby is slightly recessed from the caps, such that only the caps engage the ground when the user walks about. Preferably, the caps are formed of a molded elastomeric material such as polyurethane, to provide improved frictional engagement with the ground and thereby to make walking more comfortable for the user. In addition, if the caps become unduly worn from substantial walking, they can be readily replaced. The caps' rounded shapes also improve the cleat's aerodynamics.

With reference now to FIGS. 5-8, there is shown a second embodiment of a cleat assembly 10' in accordance with the invention. The cleat assembly 10' has many of the same components and attributes as the cleat assembly 10 of FIGS. 1-4, but it differs in that it substitutes a single horseshoe-shaped spring clip 52 for the forward and rearward spring clips 26f, 26r of the first embodiment. Components of the two cleat assemblies that correspond to each other are identified in the drawings using the same reference numerals, with the reference numerals for the components of the embodiment of FIGS. 5-8 including prime marks ('). Many of the components and functions of this second cleat assembly embodiment are the same as those of the cleat assembly disclosed in U.S. Pat. No. 6,494,117, issued in the name of Richard M. Bryne and incorporated herein by reference. As was the case with the cleat assembly 10 depicted in FIGS. 1-4, the cleat assembly 10' depicted in FIGS. 5-8 is configured for attachment to the user's left shoe, but it will be appreciated that a similar cleat assembly could be oppositely configured for attachment to the user's right shoe.

The cleat assembly 10' of FIGS. 5-8 is similar to the cleat assembly 10 of FIGS. 1-4 in that it is configured to allow its steel bottom plate 20' to be tightened over the plastic spring housing 18' without substantially affecting the size of the space that accommodates the horseshoe-shaped spring clip 52. The cleat assembly 10', likewise, is configured such that only the elastomeric caps 48f', 48r' engage the ground when the user walks about.

In addition, the cleat assembly 10' is configured to provide an adjustable float angle, which is an amount of angular rotation the cleat assembly, and thus the user's shoe, can undergo before disengaging from the pedal 12. This float reduces restrictions on the natural rotation of the user's leg during pedaling, and thus reduces the possibility of injury. Typical pedal/cleat assemblies systems have provided float ranges as high as ±7.5°.

The horseshoe-shaped spring clip 52 of the cleat assembly 10' of FIGS. 5-8 includes a forward leg 54f and a rearward leg 54r, which are supported on the spring housing 18'. The forward leg 54f is configured to engage and retain the forward edge 36 of the pedal 12, and the rearward leg 54r is configured to engage and retain the rearward edge 38 of the pedal. In particular, an inwardly projecting tongue 56f of the forward leg 54f is received in a correspondingly shaped recess 58 in the pedal's forward edge, and a similar inwardly projecting tongue 56r of the rearward leg 54r is received in a correspondingly shaped recess 60 in the pedal's rearward edge.

After the horseshoe-shaped spring clip 52 has engaged and retained the pedal 12, with the spring clip's tongues 56f, 56r received in the pedal's respective recesses 58, 60, the cleat assembly 10' is free to rotate relative to the pedal to a limited extent, both clockwise and counterclockwise. During this limited rotation, the spring clip remains locked to the pedal, and the remainder of the cleat assembly rotates relative to the spring clip. The amount of rotation is limited when a finger 62 projecting outwardly from the spring clip's mid-point reaches one of two adjustable set screws 64f, 64r. The float angle is increased by retracting the set screws, and it is decreased by extending the set screws.

The set screws 64f, 64r are received in threaded apertures 66f, 66r defined by confronting surfaces of the cleat assembly's steel bottom plate 20 and its plastic spring housing 18. Advantageously, female threads for engaging the two set screws need be formed only in the plastic spring housing; the confronting surface of the bottom plate can remain smooth and unthreaded. This allows the bottom plate to be made by stamping it from a single piece of steel sheet metal and then bending over two projections to form the confronting surfaces that retain the set screws. The threads located in the confronting surfaces of the plastic spring housing are formed readily when the housing is produced, e.g., by injection molding.

It should be appreciated from the foregoing description that the present invention provides an improved cleat assembly containing one or more spring clips configured for releasably securing the assembly to a pedal. Specifically, the cleat assembly is configured such that tightening the cleat onto the sole of a user's shoe has substantially no effect on the free flexing of the spring clip while it is engaging or disengaging to/from the pedal. In addition, the cleat assembly incorporates a pair of soft plastic caps that frictionally engage the ground when the user walks about, to reduce the possibility of the user slipping and to eliminate undesired wear of critical assembly components. Further, for embodiments of cleat assemblies of the kind incorporating one or more adjustable set screws for adjusting the assemblies' float angles, threaded apertures for the set screws are formed by the confronting surfaces of a plastic upper plate and a metallic bottom plate, wherein the threads are formed only in the plastic upper plate. This allows the upper plate to be conveniently formed of an injection-molded plastic material and the bottom plate to be conveniently stamped from a piece of sheet metal.

Although the invention has been described in detail with reference only to the presently preferred embodiments, those skilled in the art will appreciate that various modifications can be made without departing from the invention. Accordingly, the invention is defined only by the following claims.

I claim:

1. A cleat assembly configured to be releasably secured to a clipless pedal, comprising:
    a first plate disposed on the underside of a user's shoe, the first plate having a forward end and a rearward end;
    a second plate disposed over the first plate, the second plate including a forward flange projecting forward of the forward end of the first plate and a rearward flange projecting rearward of the rearward end of the first plate, wherein a space is defined between the first and second plates, and wherein an aperture is defined in the second plate, sized and configured to receive a clipless pedal; and
    a spring clip located in the space between the first and second plates, for releasably engaging the clipless pedal;
    wherein the forward and rearward flanges of the second plate are configured for attachment to the underside of the user's shoe, with the first plate disposed between the second plate and the underside of the user's shoe, and without affecting the size of the space between the first and second plates.

2. A cleat assembly as defined in claim 1, and further comprising:
    a forward cap disposed over the forward flange of the second plate; and
    a rearward cap disposed over the rearward flange of the second plate;
    wherein the forward and rearward caps engage the ground when the user walks thereon.

3. A cleat assembly as defined in claim 2, wherein:
    the forward cap is disposed over substantially the entire forward flange; and
    the rearward cap is disposed over substantially the entire rearward flange.

4. A cleat assembly as defined in claim 2, wherein the forward and rearward caps both comprise a molded elastomeric material.

5. A cleat assembly as defined in claim 1, wherein the first and second plates are configured to rotate relative to the pedal, through a selected float angle, before the spring clip releases its engagement of the pedal.

6. A cleat assembly as defined in claim 5, wherein the selected float angle is defined by stop surfaces carried by the cleat assembly and the pedal.

7. A cleat assembly as defined in claim 6, wherein the cleat assembly further comprises:
    a set screw that defines one stop surface; and
    a threaded aperture for receiving the set screw.

8. A cleat assembly as defined in claim 7, wherein:
    the first plate comprises a molded plastic material;
    the second plate comprises a metallic material; and
    the threaded aperture is defined by confronting surfaces of the first plate and the second plate.

9. A cleat assembly as defined in claim 8, wherein:
    the confronting surface of the first plate is threaded; and
    the confronting surface of the second plate is unthreaded.

10. A cleat assembly as defined in claim 8, wherein the second plate comprises steel.

11. A cleat assembly as defined in claim 5, wherein:
    the cleat assembly further comprises first and second set screws and first and second threaded apertures for threadedly receiving the respective first and second set screws, wherein a space is defined between the first and second set screws and selective rotation of either or both of the set screws varies the size of such space;
    the spring clip includes a finger located in the space between the first and second set screws;
    the cleat assembly is configured such that its spring clip can releasably engage the clipless pedal in a manner that allows limited rotation of the first and second plates relative to the pedal, while the spring clip remains rotationally locked to the pedal, the amount of such limited rotation being defined by the space defined by the first and second set screws; and the cleat assembly's first and second plates are rotatable relative to the pedal by an amount sufficient to bring one of the first and second set screws into contact with the finger of the spring clip, after which further rotation causes the spring clip to release its engagement with the pedal.

12. A cleat assembly configured to be releasably secured to a clipless pedal, comprising:
   a first plate disposed adjacent to the underside of a user's shoe;
   a second plate disposed over the first plate, wherein a space is defined between the first and second plates, and wherein an aperture is defined in the second plate, sized and configured to receive a clipless pedal, wherein the first and second plates, together, define a threaded aperture; and
   a spring clip located in the space between the first and second plates, for releasably engaging the clipless pedal; and
   a set screw threadedly received in the threaded aperture, wherein the position of the set screw is adjustable to define a float angle through which the cleat assembly can rotate relative to the pedal before it is released therefrom;
   wherein the first plate comprises a molded plastic material and the second plate comprises a metallic material;
   and wherein the threaded aperture is defined by confronting surfaces of the first plate and the second plate.

13. A cleat assembly as defined in claim 12, wherein:
   the confronting surface of the first plate is threaded; and
   the confronting surface of the second plate is unthreaded.

14. A cleat assembly as defined in claim 12, wherein the second plate is stamped from a sheet of steel.

15. A cleat assembly as defined in claim 12, and further comprising:
   a forward cap disposed over a forward end of the second plate; and
   a rearward cap disposed over a rearward end of the second plate;
   wherein the forward and rearward caps engage the ground when the user walks thereon.

16. A cleat assembly as defined in claim 15, wherein the forward and rearward caps both comprise a molded elastomeric material.

17. A cleat assembly configured to be releasably secured to a clipless pedal, comprising:
   a first plate disposed adjacent to the underside of a user's shoe, the first plate having a forward end and a rearward end;
   a second plate disposed over the first plate, the second plate including a forward flange projecting forward of the forward end of the first plate, and a rearward flange projecting rearward of the rearward end of the first plate, wherein a space is defined between the first and second plates, and wherein an aperture is defined in the second plate, sized and configured to receive a clipless pedal;
   a forward cap disposed over the forward flange of the second plate; and
   a rearward cap disposed over the rearward flange of the second plate;
   wherein the forward and rearward caps engage the ground when the user walks thereon.

18. A cleat assembly as defined in claim 17, wherein:
   the forward cap is disposed over substantially the entire forward flange; and
   the rearward cap is disposed over substantially the entire rearward flange.

19. A cleat assembly as defined in claim 17, wherein the forward and rearward caps both comprise a molded elastomeric material.

20. A cleat assembly as defined in claim 1, wherein:
   the cleat assembly further comprises a base plate secured directly to the underside of the user's shoe; and
   the forward and rearward flanges of the second plate are configured for attachment directly to the base plate.

* * * * *

UNITED STATES PATENT AND TRADEMARK OFFICE
CERTIFICATE OF CORRECTION

| | | |
|---|---|---|
| PATENT NO. | : 7,472,498 B2 | |
| APPLICATION NO. | : 11/250911 | |
| DATED | : January 6, 2009 | |
| INVENTOR(S) | : Richard M. Bryne | |

It is certified that error appears in the above-identified patent and that said Letters Patent is hereby corrected as shown below:

The title page showing the illustrative figure should be deleted to be replaced with the attached title page.

Figure 1:
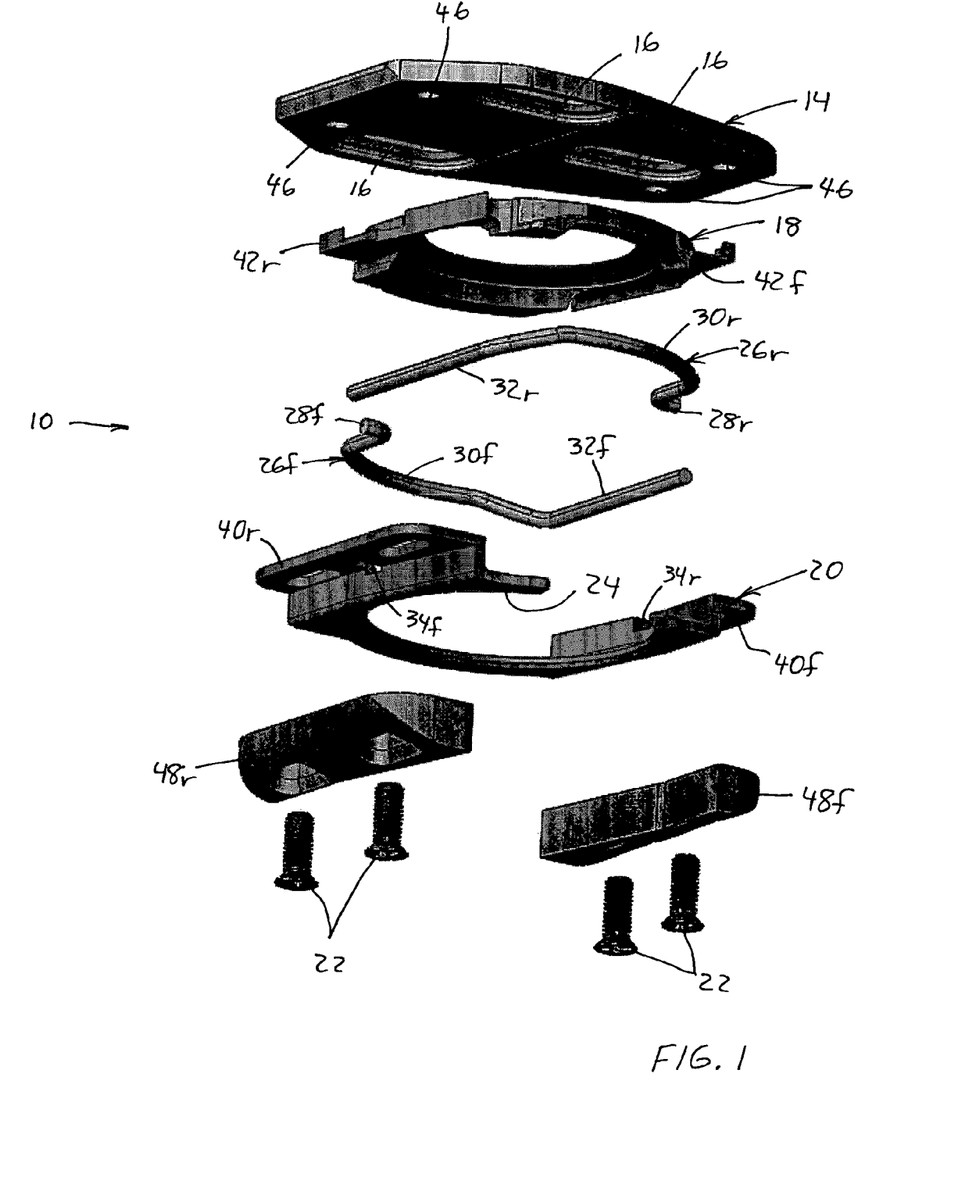
FIG. 1 is an exploded perspective view of the underside of a first embodiment of a cleat assembly in accordance with the invention.
Figure 2:
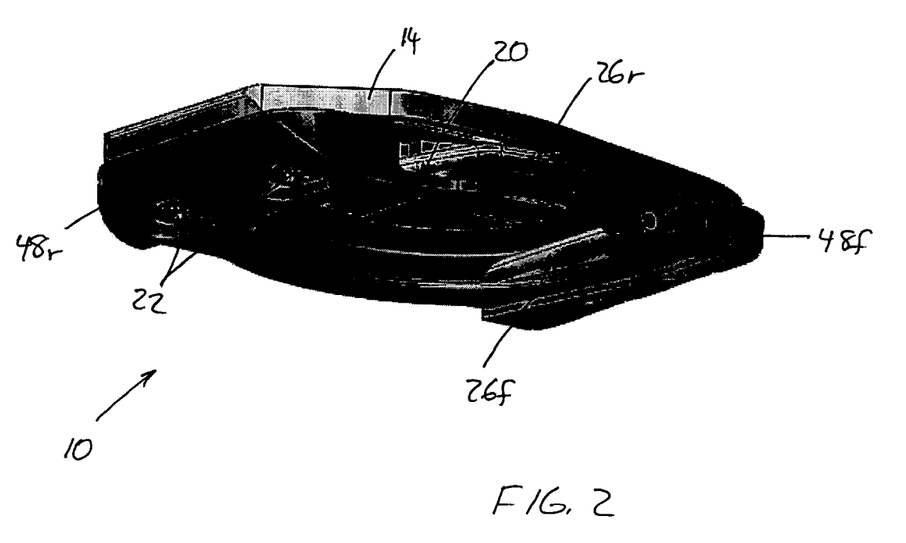
FIG. 2 is a perspective view of the underside of the cleat assembly of FIG. 1, shown in its assembled condition.

In the drawings, Fig. 1 should be replaced with the corrected Fig. 1 as shown on the attached page.

Column 1, Line 24 change "tightening" to "improper over-tightening"

Signed and Sealed this
Twenty-sixth Day of June, 2012

David J. Kappos
*Director of the United States Patent and Trademark Office*

(12) United States Patent
Bryne (10) Patent No.: US 7,472,498 B2
(45) Date of Patent: Jan. 6, 2009

(54) CLEAT ASSEMBLY FOR CLIPLESS PEDAL

(75) Inventor: Richard M. Bryne, San Diego, CA (US)

(73) Assignee: Speedplay, Inc., San Diego, CA (US)

( * ) Notice: Subject to any disclaimer, the term of this patent is extended or adjusted under 35 U.S.C. 154(b) by 416 days.

(21) Appl. No.: 11/250,911

(22) Filed: Oct. 13, 2005

(65) Prior Publication Data
US 2007/0084086 A1 Apr. 19, 2007

(51) Int. Cl.
*A43B 5/14* (2006.01)
*G05G 1/14* (2006.01)

(52) U.S. Cl. .................................. 36/131; 74/594.4
(58) Field of Classification Search .................. 36/131; 74/594.6, 594.4
See application file for complete search history.

(56) References Cited

U.S. PATENT DOCUMENTS

| | | | | |
|---|---|---|---|---|
| 4,827,797 | A | * | 5/1989 | Le Faou et al. ............ 74/594.6 |
| 4,942,778 | A | | 7/1990 | Bryne |
| 5,213,009 | A | | 5/1993 | Bryne |
| 5,606,894 | A | | 3/1997 | Bryne |
| 5,657,558 | A | | 8/1997 | Pohu |
| 5,687,619 | A | | 11/1997 | Bryne |
| 5,862,716 | A | | 1/1999 | Bryne |
| 6,244,136 | B1 | | 6/2001 | Chen |
| 6,494,117 | B1 | * | 12/2002 | Bryne ...................... 74/594.6 |

| | | |
|---|---|---|
| 2004/0187635 | A1 | 9/2004 Bryne |

FOREIGN PATENT DOCUMENTS

| | | |
|---|---|---|
| EP | 0 153 210 | 8/1985 |
| EP | 0 293 340 | 11/1988 |
| FR | 2 775 424 | 9/1999 |
| JP | 05111402 | 5/1993 |

* cited by examiner

*Primary Examiner*—Ted Kavanaugh
(74) *Attorney, Agent, or Firm*—Sheppard Mullin Richter & Hampton LLP (57) ABSTRACT

An improved cleat assembly is disclosed, the assembly containing one or more spring clips configured for releasably securing the assembly to a bicycle pedal or the like. Specifically, the cleat assembly is configured such that an improper over-tightening of the cleat onto the sole of a user's shoe has substantially no effect on the free flexing of the spring clip while it is engaging or disengaging to/from the pedal. In addition, the cleat assembly incorporates a pair of soft plastic caps that frictionally engage the ground when the user walks about, to provide improved traction and to eliminate undesired wear of critical assembly components. Further, for embodiments of cleat assemblies of the kind incorporating one or more adjustable set screws for adjusting the assemblies' float angles, threaded apertures for the set screws are formed by the confronting surfaces of a plastic upper plate and a metallic bottom plate, wherein the threads are formed only in the plastic upper plate. This allows the upper plate to be conveniently formed of an injection-molded plastic material and the bottom plate to be conveniently stamped from a piece of sheet metal.

20 Claims, 8 Drawing Sheets

FIG. 1